UNITED STATES PATENT OFFICE.

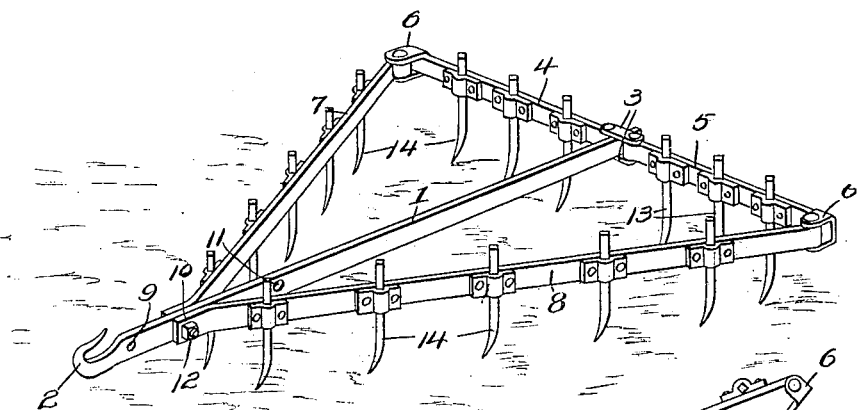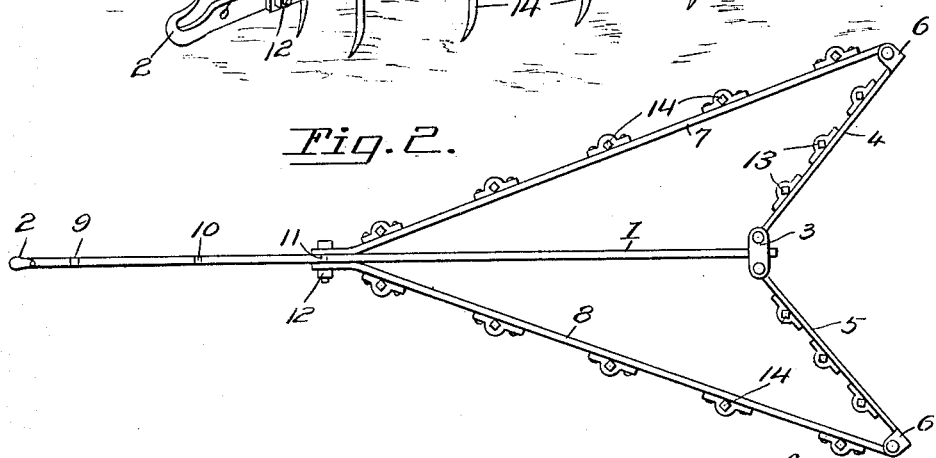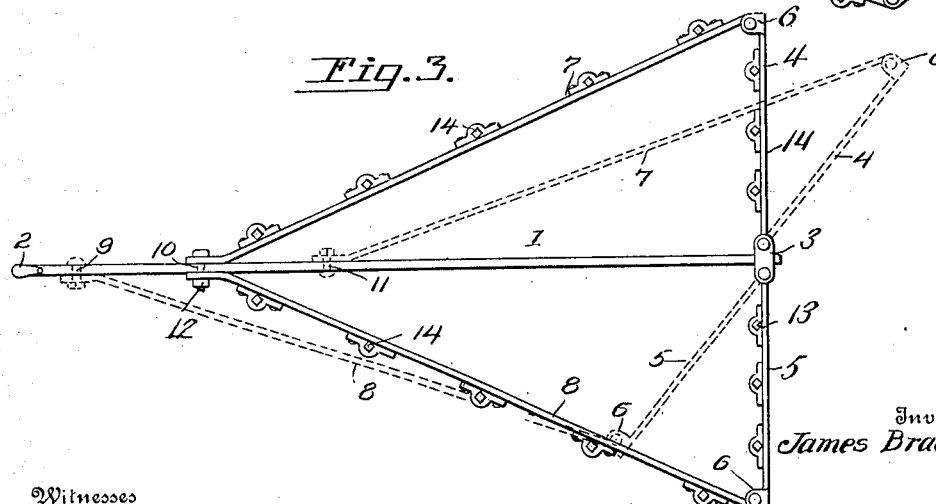

JAMES BRADFORD, OF NEBO, LOUISIANA, ASSIGNOR OF ONE-HALF TO DAVID SHAPIRO, OF NEBO, LOUISIANA.

CULTIVATING-HARROW.

No. 913,256.  Specification of Letters Patent.  Patented Feb. 23, 1909.

Application filed December 14, 1907.  Serial No. 406,544.

*To all whom it may concern:*

Be it known that I, JAMES BRADFORD, citizen of the United States, residing at Nebo, in the parish of Catahoula and State of Louisiana, have invented new and useful Improvements in Cultivating-Harrows, of which the following is a specification.

This invention relates to cultivating harrows, and the object of the invention is to provide a simple and effective construction of combined harrow and cultivator embodying movable or adjustable sections whereby the width of the implement may be varied to suit conditions and whereby also the general shape of the harrow frame and the disposition of the teeth and shovels thereof may be varied to adapt the implement for use as an ordinary harrow, cultivator or side harrow.

With the above general object in view, the invention consists in the construction, combination and arrangement of parts hereinafter fully described, illustrated and claimed.

In the accompanying drawings:—Figure 1 is a perspective view of a combined harrow and cultivator embodying the present invention. Fig. 2 is a plan view of the same, showing the manner of adjusting the parts of the harrow to decrease the width or sweep thereof. Fig. 3 is a plan view of the harrow extended to its full width also indicating by dotted lines the manner of adjusting the parts to adapt the implement for use as a side harrow.

The frame of the harrow contemplated in this invention comprises essentially a center or draft bar 1 provided at its forward end with a hook or clevis 2 and also comprising at its rear end upper and lower pivot lugs 3 to which are pivotally connected the inner ends of oppositely extending cross bar sections 4 and 5. At their outer ends the cross bar sections 4 and 5 are provided with pivot lugs 6 to which are pivotally connected the rear extremities of adjustable side bars 7 and 8, which at their forward ends are adapted to be connected to the center or draft bar 1 at any one of several points as will hereinafter appear. For the purpose of so attaching the side bars 7 and 8 to the draft bar 1 the latter is provided with a plurality of holes 9, 10 and 11 adapted to receive a bolt or other suitable fastener 12 which also passes through the forward ends of the side bars 7 and 8 as shown in the drawings. Harrow teeth 13 in any suitable number are mounted on the cross bar sections 4 and 5 and similar harrow teeth 14 are secured to the side bars 7 and 8 as clearly shown.

The usual arrangement of the parts is illustrated in full lines in Figs. 1 and 3 wherein the cross bar sections 4 and 5 are arranged in line with each other and extend straight across the machine perpendicularly to the draft bar 1, while the forward ends of the side bars are connected to the draft bar 1 in line with each other by means of the bolt 12. If for any reason it is desired to make the implement narrower, the bolt 12 is removed and the ends of the side bars are set back to another hole at which point they are secured by the bolt 12 thus making the harrow frame assume the shape shown in Fig. 2.

To adapt the implement for use as a side harrow, one of the side arms 8 is connected to the draft bar 1 at a point further forward as shown in Fig. 3, while the other side bar is connected to a point further back as shown in the same figure. In this position of the parts, the cross bar sections 4 and 5 while being in a straight line with each other are disposed at an angle to the center bar as shown by dotted lines in Fig. 3.

From the foregoing description, it will be seen that the implement is adapted for use as an ordinary harrow, cultivator or a side harrow and that the width of the harrow may be increased or diminished to suit conditions. A strong connection is formed between the cross bar sections 4 and 5 and the rear end of the center bar 1 and a thoroughly strong connection is also afforded between the said side bars and center bar at the forward end of said side bars, thus making a strong and durable construction.

Having thus described the invention, what I claim as new, is:—

An all metal implement of the class described, comprising a central draft bar disposed edgewise vertically and provided with holes extending horizontally therethrough, cross bar sections extending in opposite directions from the draft bar and connected pivotally thereto and consisting of flat metal bars set endwise vertically, side bars of like material and disposition pivotally connected at their rear ends to the cross bar sections and having an independent adjustable bolted connection at their forward ends with the draft bar, metal teeth holding clips fastened to said side and cross bars, and teeth held by said clips, substantially as described.

In testimony whereof I affix my signature in presence of two witnesses.

JAMES BRADFORD.

Witnesses:
S. B. HARRIS,
J. R. TYSON.